June 2, 1953 J. F. McGUSHIN 2,640,561
PNEUMATIC TOOL LUBRICATOR
Filed Jan. 30, 1951
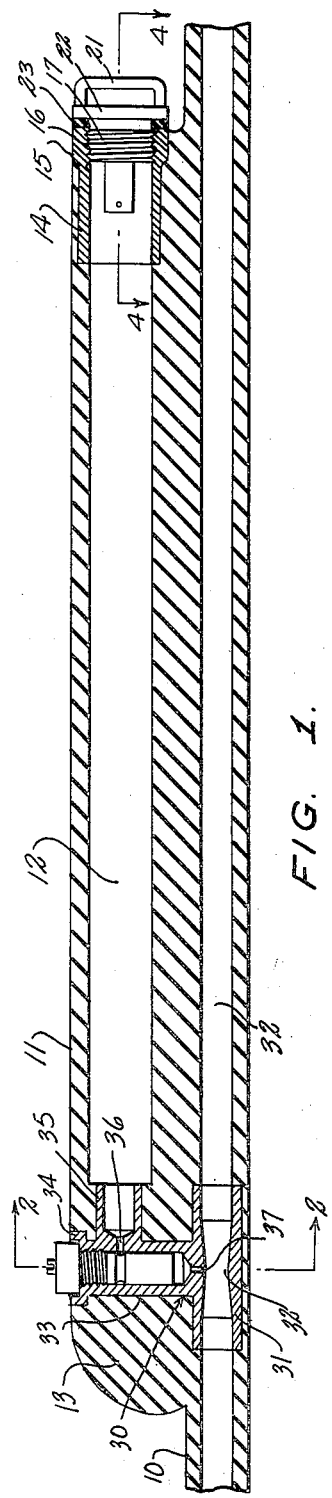
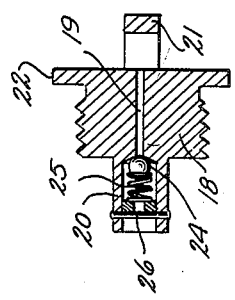
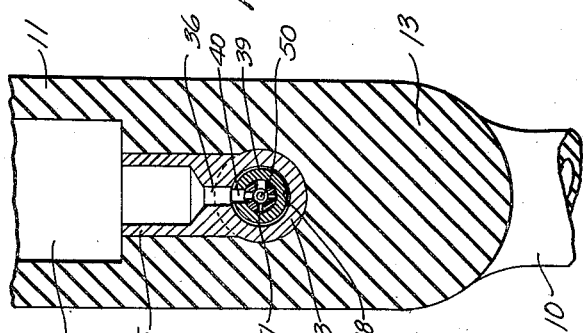
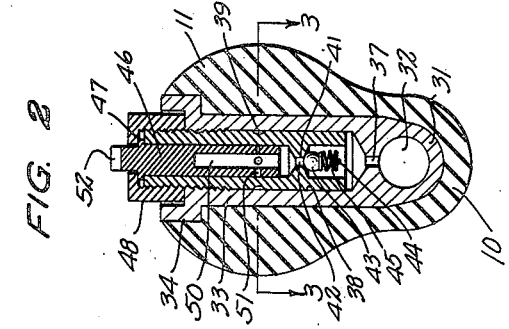
INVENTOR.
JOSEPH F. McGUSHIN,
BY
McMorrow, Berman + Davidson
ATTORNEYS.

Patented June 2, 1953

2,640,561

UNITED STATES PATENT OFFICE 2,640,561

PNEUMATIC TOOL LUBRICATOR

Joseph Francis McGushin, Warm Springs, Calif.

Application January 30, 1951, Serial No. 208,644

9 Claims. (Cl. 184—55)

This invention relates to oil injecting devices applied to the compressed air lines or hoses for pneumatic tools, and constitutes a continuation in part of my pending application, Serial No. 167,035, filed June 9, 1950, and now abandoned, for Pneumatic Tool Lubricator.

It is among the objects of the invention to provide an improved oil injector attachment for a compressed air hose to supply lubricant to a pneumatic tool connected to the hose, which attachment or oil injecting device is formed integrally with the air hose and requires no cutting or separation of the air hose for its installation; which provides an oil reservoir disposed alongside the air hose and formed of material of substantially the same flexibility as the material of the hose, and a valve admitting oil from the reservoir to the hose while positively precluding admission of air under pressure from the hose to the reservoir; which includes a filler opening for the oil reservoir and a closure cap for the filler opening which admits make up air from the atmosphere to the reservoir while precluding leakage of oil from the reservoir to the filler opening; which can be provided as a molded structure along with the associated hose with the valve and a filler opening sleeve permanently molded into the structure; and which is simple and durable in construction, economical to manufacture, and positive and effective in operation.

Other objects and advantages will become apparent from a consideration of the following description and the appended claims in conjunction with the accompanying drawing, wherein:

Figure 1 is a longitudinal cross-sectional view through a pneumatic tool lubricating device illustrative of the invention;

Figure 2 is a transverse cross-sectional view on the line 2—2 of Figure 1;

Figure 3 is a fragmentary cross-sectional view on the line 3—3 of Figure 2; and

Figure 4 is a cross-sectional view of a filler opening closure plug taken on the line 4—4 of Figure 1.

With continued reference to the drawing, the numeral 10 designates a compressed air hose formed of suitable flexible material, such as vulcanized rubber or vulcanized rubber with a cord or fabric reinforcement, and the numeral 11 designates a structure molded integrally with the hose 10 and extending longitudinally of the hose, this structure being hollow to provide an elongated oil reservoir chamber 12 extending along the hose. The structure 11 is preferably formed of the same material as that of which the hose 10 is formed, and, while vulcanized rubber or reinforced rubber has been indicated as suitable material from which the hose and reservoir structure may be provided, it is to be understood that this combined structure may be formed of other materials, such as flexible, synthetic resin plastic, synthetic rubber or fiber impregnated with a suitable binder.

One end of the structure 11 is closed by a solid end portion 13, and the other end is left open to provide a filler opening for the reservoir chamber 12.

A filler opening sleeve 14 formed of a suitable metal, preferably a corrosion resisting metal, such as stainless steel or brass, is fitted into the open end of the reservoir structure 11 and is provided at one end with an external flange or flat ridge 15 overlying the end of the structure 11 and internally with screw-threads 16 at the open end of the structure.

Where the hose and reservoir providing structure are formed of vulcanized rubber, either natural or synthetic, the sleeve 14 is vulcanized to the rubber and permanently bonded thereto.

An externally screw-threaded closure plug 17 is threaded into the internally screw-threaded end of the sleeve 14 and comprises a cylindrical, externally screw-threaded body portion 18 having an aperture or bore 19 extending therethrough, a hollow boss 20 projecting from one end of the body portion 18 coaxially of the bore 19, and a U-shaped handle or bail 21 secured at its ends to the body portion 18 and extending substantially diametrically thereof. At its end to which the bail 21 is secured the body portion is provided with an outwardly projecting, annular flange 22, and a sealing gasket 23 of suitable resilient material is clamped between this flange and the adjacent end of the sleeve 14 to provide an anti-seal between the closure cap or plug and the sleeve.

A valve ball 24 is disposed in the boss 20 at the inner end of the bore 19 and a compression spring 25 is disposed in the boss between this ball and a spring abutment pin 26 which extends diametrically of the boss near the end of the latter remote from the body portion 18 of the plug. The ball 24, under the influence of spring 25, controls the air passage aperture 19 through the plug, so that replacement air can be drawn through this aperture to make up for the volume of oil withdrawn from the reservoir chamber 12, but neither oil nor air can leak out of the reservoir through the plug.

A valve, generally indicated at 30, is disposed in the combined hose and reservoir structure at the other or closed end of the reservoir structure, and is also preferably molded and vulcanized into the combined structure.

The valve 30 has a T-shaped hollow body including a tubular cross portion 31 disposed in the hose portion 10 of the combined hose and reservoir structure with its bore coaxial with the bore 32 of the hose and constituting a Venturi formation. The bore through the cross portion 31 of the valve 30 is of substantially the same diameter as the hose bore 32 at the ends of the body portion 31, but is tapered from both directions toward the mid-length location of the body portion 31 to provide intermediate the length of this body portion and substantially at the mid-length location thereof a Venturi throat 32. The hollow valve body further includes a tubular stem portion 33 which extends perpendicularly from the cross portion 31 with its longitudinal center line extending through the Venturi throat 32. This stem portion extends through the solid end 13 of the structure 11 and has its distal end, remote from the cross portion 31, an outwardly offset annular flange 34, the outer edge of which is flush with the surface of the structure 11 at a location on the structure remote from the hose 10. A hollow boss 35 extends perpendicularly from the stem portion 33 intermediate the length of the stem portion to the adjacent end of the reservoir chamber 12 to connect this chamber with the interior of the stem portion 33 and the interior of the cross portion 31 of the valve body.

The stem portion 33 is formed to provide a restricted aperture 36 between the interior of the boss 35 and the interior of the stem portion, and a restricted aperture 37 between the interior of the stem portion 33 at the end thereof adjacent the cross portion 31 and the interior of the cross portion at the Venturi throat 32.

The restricted apertures or orifices 36 and 37 together with the bores or hollow interiors of the boss 35 and stem portion 33 provide a passage from the oil reservoir chamber 12 to the interior of the cross-portion 31 of the valve body at the Venturi throat 32, so that oil from the reservoir chamber can be admitted to the interior of the cross portion 31 at the Venturi throat and carried from this location through the hose 10 by the compressed air passing through the hose to a pneumatic tool, not illustrated, connected to one end of the hose.

A cylindrical sleeve 38 is received in the stem portion 33 of the valve body and is provided near one end with external screw-threads which engage with internal screw-threads provided in the stem portion 33 near the offset flange 34 to secure the sleeve 38 in the stem portion of the valve body with one end of the sleeve adjacent the aperture 37 and its other end extending outwardly of the flanged end of the stem portion 33 of the valve body. This sleeve is provided intermediate its length with an annular external groove 39 which registers with the aperture 36 in the stem portion 33 of the valve body and with an aperture 40 which extends from the bore of the sleeve to the groove 39 to admit oil from the interior of the boss 35 to the bore of the sleeve.

Between the groove 39 and the end thereof adjacent the aperture 37 the sleeve is provided with a transverse partition 41 having a restricted aperture or orifice 42 therethrough, and a ball valve 33 is disposed in the bore of the sleeve at the side of the partition 41 remote from the groove 39. A spring abutment pin 44 extends diametrically through the sleeve near the end of the latter adjacent the aperture 37, and a coil compression spring 45 is disposed between this pin and the partition 41 and resiliently urges the ball 43 into seating engagement with the partition at the adjacent end of the aperture 42.

The check valve including the ball 43 and spring 45 controls the aperture 42, so that oil can pass from the interior of the sleeve 38 through the apertures 42 and 37 to the bore of the cross portion 31 of the valve body at the Venturi throat 32, but air from the hose 10 is precluded from passing through these apertures to the interior of the sleeve beyond the partition 41 and into the oil reservoir chamber 12.

A metering gate 46 of elongated, cylindrical shape is rotatably mounted in the bore of the sleeve 38 between the partition 41 and the end of the sleeve adjacent the flanged distal end of the valve body stem portion 33. This metering gate projects out of the sleeve 38 at the outer end of the sleeve and is provided with an external annular flange 47 which rests upon the outer end of the sleeve 38. A flanged nut 48 is threaded onto the externally screw-threaded outer end of the sleeve and bears upon the flange 47 of the metering gate to maintain the gate in the sleeve and lock the gate in adjusted position in the sleeve.

The metering gate 46 adjacent the flange 47 is closed, but a coaxial bore 50 is provided in the metering gate and extends from a location intermediate the length of the gate to the end of the gate adjacent the aperture 42 in the sleeve. Intermediate the length of this bore the metering gate is provided with orifices 51 extending from the external surface of the metering gate to the bore 50. These orifices are angularly spaced apart around the cylindrical gate and are of respectively different sizes for controlling the rate at which oil is metered from the oil reservoir chamber 12 into the bore 32 of the air hose. At its outer end adjacent the nut 48 the metering gate 46 is provided with a diametrical tool slot 52 for receiving a tool, such as a screw driver, by means of which the gate can be rotated in the sleeve to selectively place the orifices 51 in registry with the aperture 40 in the sleeve.

The outer end or flanged end of the nut 48 may be provided with suitable indicia which cooperate with the tool slot 52 to indicate which orifice 51 of the metering gate is in registry with the sleeve aperture 40 at any time.

With the above-described arrangement, when the air flowing through the hose 10 to a pneumatic tool is caused to pulsate in the hose by the operation of the tool, the surging of the air will cause periodic intervals of low air pressure at the Venturi throat 32. When these low air pressure intervals occur oil will be drawn from the reservoir chamber 12 through the interior of the boss 35, the aperture 33 in the valve body, the aperture 40 in the sleeve and the selected orifice 51 into the bore 50 of the metering gate, and from the bore of the metering gate through the aperture 42, past the ball 43 of the check valve and then through the aperture 37 into the bore of the cross portion 31 of the valve body at the Venturi throat 32, and there picked up by the air flowing through the hose and the bore of the cross portion of the valve body. When the air pressure at the Venturi throat rises, the check valve including the ball 43 will close, precluding flow of air under pressure through the above-described oil passage from the bore of the hose into the oil reservoir chamber 12. As the oil is gradually drawn out of the chamber in the above-described manner, replacement air for the oil will flow through the bore or aperture 19 of the filler opening closure plug 17 into the oil reservoir chamber, leakage of air and oil from the chamber being precluded by the check valve ball 24, as described above.

The invention may be embodied in other specific forms without departing from the spirit or essential characteristics thereof. The present embodiment is, therefore, to be considered in all respects as illustrative and not restrictive, the scope of the invention being indicated by the appended claims rather than by the foregoing description, and all changes which come within the meaning and range of equivalency of the claims are, therefore, intended to be embraced therein.

What is claimed is:

1. A pneumatic tool lubricator comprising a length of compressed air hose of flexible material, a structure on said hose formed of flexible material and providing an oil reservoir chamber extending longitudinally of the hose, said structure having one end closed and the other end open to provide a filler opening for said reservoir chamber, a filler opening sleeve secured in said structure at the open end thereof, a closure plug releasably secured in said sleeve and having an air passage aperture therethrough, a check valve carried by said closure plug and controlling said air passage aperture to admit air through said plug into said chamber and preclude leakage of oil from the chamber through said plug, and a valve in said structure at the other end of said chamber for admitting oil from said reservoir chamber into said hose while precluding the admission of air from said hose into said chamber, said valve comprising a hollow T-shaped body having a cross portion disposed in said hose and provided intermediate its length with a Venturi throat, a stem portion extending from said cross portion at the location of said Venturi throat and through said structure, and a hollow boss extending from said stem portion intermediate the length of the latter to the adjacent end of said reservoir chamber, said body providing a first aperture between the interior of said stem portion and the interior of said cross portion at said Venturi throat and a second aperture between the interior of said boss and the interior of said stem portion, a sleeve threaded into said stem portion and having an aperture in communication with said second aperture, a metering gate rotatably received in said sleeve and having a bore opening to the end thereof adjacent said first aperture and metering orifices of different sizes extending at angularly spaced apart intervals around said gate from the exterior of said gate to said bore and selectively registrable with the aperture in said sleeve, a nut threaded onto said sleeve and engaging said metering gate at the closed end of the latter to retain said gate in said sleeve, said sleeve providing a restricted opening therein between said metering gate and said first aperture, and a check valve in said sleeve controlling said restricted opening to preclude passage of air from the cross portion of said valve body through the bore of said metering gate into said oil reservoir chamber.

2. A pneumatic tool lubricator comprising a length of compressed air hose of flexible material, a structure of flexible material formed on and extending along said hose and providing an oil reservoir chamber extending longitudinally of the hose, said structure being closed at one end of said chamber and open at the other end to provide a filler opening for said chamber, means including a removable plug closing the open end of said structure, and a valve disposed in said structure at the closed end thereof and including a hollow body communicating with said reservoir chamber and the interior of said hose and providing a Venturi throat in said hose, a check valve in said valve body precluding passage of air from said hose through said valve body to said reservoir chamber, and means in said valve body metering the flow of oil from said reservoir chamber through said valve body to the interior of said hose.

3. A pneumatic tool lubricator comprising a compressed air hose, means providing an oil reservoir chamber adjacent said hose, and a valve including a hollow valve body having a portion received in said hose and providing a Venturi throat therein and a portion in communication with said oil reservoir chamber, a check valve in said valve body precluding passage of air under pressure of said hose through said valve body to said oil reservoir chamber while admitting oil from said chamber into said hose, and means in said valve body metering the flow of oil from said chamber to said hose.

4. A pneumatic tool lubricator comprising a compressed air hose, means providing an oil reservoir chamber adjacent said hose, and a valve including a hollow valve body having at one end a portion received in said hose and providing a Venturi throat therein and its other end spaced from said hose and having intermediate its ends a portion in communication with said oil reservoir chamber, a check valve in said valve body precluding passage of air under pressure from said hose through said valve body to said oil reservoir chamber while admitting oil from said chamber into said hose, and means in said valve body metering the flow of oil from said chamber to said hose, said oil metering means being adjustable to vary the rate of flow of oil from said chamber to said hose and being accessible for adjustment at said other end of the valve body.

5. A pneumatic tool lubricator comprising a length of flexible hose, a lubricant receptacle provided on said hose and having a wall portion of which is common with the wall of said hose, a Venturi formation in said hose, a sleeve extending through the common wall portion of said hose and said receptacle and through the latter from the throat of said Venturi formation to the exterior of said receptacle wall and having a hole in the portion thereof disposed within said receptacle, and a plug disposed in said sleeve and adjustably rotatable therein, said plug having fluid passages of different capacities selectively connectible between said hole and said Venturi throat to admit lubricant from said receptacle to air flowing through said Venturi throat.

6. A pneumatic tool lubricator comprising a length of flexible hose, a lubricant receptacle provided on said hose and having a flexible wall united at its edges with the wall of said hose, a Venturi formation in said hose, a valve sleeve extending through the walls of said hose and said receptacle from the throat of said Venturi formation to the exterior of said receptacle wall and having a hole in the portion thereof disposed within said receptacle, a plug disposed in said valve sleeve and adjustably rotatable therein, said plug having fluid passages of different capacities selectively connectible between said hole and said Venturi throat to admit lubricant from said receptacle to air flowing through said Venturi throat, an internally screw threaded filler sleeve mounted in said receptacle wall providing a filler opening for said receptacle, and a screw plug threaded into said filler sleeve to close said filler opening.

7. A pneumatic tool lubricator comprising a hose fabricated of flexible material and having a passage extending therethrough for the flow of air under pressure, a closed receptacle fabricated of flexible material arranged externally of said hose and secured thereto for the reception of a lubricating oil, a sleeve extending through said receptacle and said hose and having one end in communication with the air passage in said hose and having its other end exposed at the outer surface of said receptacle, said sleeve having a hole in the portion thereof disposed within said receptacle, a plug positioned within said sleeve and having one end adjacent said one end of said sleeve, said plug having at least one oil passage therein extending from the hole in said sleeve to said one end of the latter and communicating with said air passage, and a Venturi formation positioned within said air passage adjacent said one end of said plug and communicating with said oil passage for causing oil to be drawn from said receptacle into said air passage.

8. A pneumatic tool lubricator comprising a hose fabricated of flexible material and having a passage extending therethrough for the flow of air under pressure, a closed receptacle fabricated of flexible material arranged externally of said hose and secured thereto for the reception of a lubricating oil, a sleeve extending through said receptacle and said hose and having one end in communication with the air passage in said hose and having its other end exposed at the outer surface of said receptacle, said sleeve having a hole in the portion thereof disposed within said receptacle, a plug positioned within said sleeve and having one end adjacent said one end of said sleeve, said plug having at least one oil passage therein extending from the hole in said sleeve to said one end of the latter and communicating with said air passage, a Venturi formation positioned within said air passage adjacent said one end of said plug and communicating with said oil passage for causing oil to be drawn from said receptacle into said air passage, and valve means in said oil passage precluding flow of air from said air passage into said receptacle while permitting the flow of lubricating oil from said receptacle into said air passage.

9. A pneumatic tool lubricator comprising a length of hose of flexible material having a Venturi formation therein, a hollow body of flexible material provided on said hose and extending along the latter in overlapping relationship to said Venturi formation, said hollow body providing a lubricant reservoir therein and having an aperture extending transversely thereof to the throat portion of said Venturi formation and communicating with said lubricant reservoir, a valve sleeve extending through said aperture and having a hole therein within said hollow body and in communication with said lubricant reservoir and an orifice in one end thereof communicating with said Venturi throat, and a plug mounted in said sleeve for rotational movements of adjustment relative to the latter and having angularly spaced apart metering orifices of different capacities extending radially thereof and selectively registrable with the hole in said sleeve and a bore extending longitudinally thereof from the inner ends of said metering orifices to the end thereof adjacent the orifice in said sleeve.

JOSEPH FRANCIS McGUSHIN.

References Cited in the file of this patent

UNITED STATES PATENTS

| Number | Name | Date |
| --- | --- | --- |
| 1,751,714 | Peters | Mar. 25, 1930 |
| 2,205,558 | Heftler et al. | June 25, 1940 |